July 7, 1959

D. O. SPANN 2,893,510

SPHERICAL SEPARATOR

Filed Jan. 18, 1957

INVENTOR
DELROY O. SPANN

BY *Diggms & LeBlanc*

ATTORNEYS

INVENTOR
DELROY O. SPANN
BY *Diggms & LeFlane*
ATTORNEYS

United States Patent Office 2,893,510
Patented July 7, 1959

2,893,510

SPHERICAL SEPARATOR

Delroy O. Spann, Baton Rouge, La., assignor to Delta Tank Manufacturing Company, Baton Rouge, La., a corporation of Louisiana Application January 18, 1957, Serial No. 635,067

11 Claims. (Cl. 183—2.7)

This invention relates to improvements in liquid and gas separators and more particularly relates to a spherical oil and gas separator.

In assignee's copending applications, Serial No. 490,282, filed February 24, 1955, now Patent No. 2,788,080, and Serial No. 552,454, filed December 12, 1955, now abandoned, there are disclosed liquid and gas separators in the form of compact spherical tanks providing all of the structural advantages of spherical tanks and also the advantages of low velocity separation and high capacity mist extraction. The separators shown in both of these applications utilize three-stage separation processes wherein the first stage comprises rapidly reducing the velocity of incoming slugs of liquid and gas by means of baffles immediately adjacent the tank wall through which the liquid and gas are introduced into the tank. This occurs near the horizontal center plane of the spherical tank. The baffle dissipates the velocity of the liquid slugs so as to cause the liquid to drop into the lower portion of the tank, while the gas escapes around the baffle into a large middle section of the tank.

The gas loses a great deal of its velocity upon entering this large middle section of the tank and its turbulence is reduced to a minimum. Streamlined flow conditions are established and the gas loses its ability to hold liquid drops of a critical size or larger, and as a result these drops fall vertically downward under the force of gravity to the lower portion of the tank. In the third phase of the separation the gas stream containing fine liquid particles below the critical size moves upward and passes through a mist extractor wherein substantially all of the remaining liquid is removed from the gas. The liquid removed by the mist extractor forms into drops and falls vertically downward under the force of gravity to the lower portion of the tank.

In accordance with the present invention it has now been found that improved separation may be obtained by utilizing tangential flow of a particular type in lieu of rapidly reduced flow caused by inlet baffles immediately adjacent the tank walls. It thus has been found that if the incoming liquid is caused to flow circumferentially about the tank in both directions, a large liquid gas interface can be obtained per unit volume of fluid being handled. It has further been found that manufacture of the separators is facilitated and installation is simplified if the fluid inlet and oil outlet connections to the separator tank are both provided in the lower section thereof.

The present invention thus contemplates a spherical separator tank formed in horizontally divided halves and having an oil and gas inlet in the lower half just below the horizontal center plane. An inlet pipe extends from this oil and gas inlet diametrically across the tank upwards into the upper half of the tank, passing through substantially the center of the tank. At the end of this inlet pipe there is provided a flow diverter which is mounted adjacent the wall of the upper half of the tank and diverts half of the incoming fluid tangentially against the wall of the tank in one direction, and the other half of the incoming fluid tangentially against the wall of the tank in the other direction. This sets up two opposed tangential flows which tend to keep the liquid in the bottom of the tank more or less quiescent rather than setting up a large swirl. By extending the inlet pipe from below the horizontal centerline upward through the central portion of the vessel, another important advantage is gained, namely that of cleaning up the walls of the upper hemisphere for streamline liquid flow, uninterrupted by appurtenances which would cause eddies, splashing, etc., with resultant reentrainment of liquid particles in the gas.

An apertured horizontal baffle plate is provided just below the horizontal center plane of the tank and tends to prevent splashing of the liquid from the liquid zone into the gas zone of the tank. In addition, this baffle also tends to limit the height to which froth can collect on the surface of the liquid in the bottom of the tank when foamy or frothy oil is supplied to the separator. Vertical baffle plates are also provided in the lower portion of the tank to provide a further tranquilizing function.

In accordance with another feature of the present invention a mist extractor is provided in the top of the upper half of the tank and contains a built in, self-resetting bypass which prevents the pressure drop across the mist extractor from exceeding a certain predetermined maximum. During operation of the separator, the pressure drop across the mist extractor may become excessively high due to overloading caused by an excessive oil and gas input, or due to plugging of the extractor by paraffin or other foreign material. This excessive pressure unbalance may seriously damage the mist extractor and, in certain instances, is capable of completely destroying it. The bypass provided according to this invention comprises a weight loaded valve passing directly through the mist extractor as an integral part thereof. When the pressure drop across the mist extractor exceeds a certain predetermined amount, the pressure differential causes the weight loaded valve to lift thereby permitting the gas to be bypassed through the valve. When the pressure differential drops below this predetermined amount, the valve again seats and the mist extractor is again effective.

It is accordingly a primary object of the present invention to provide an improved spherical liquid and gas separator.

It is another object of the invention to provide a spherical liquid and gas separator formed in two hemispheres joined on a horizontal center plane wherein the incoming liquid is admitted into the lower hemisphere and is discharged into the upper hemisphere.

It is another object of the invention to provide an improved spherical liquid and gas separator wherein the incoming liquid is caused to flow in a pair of oppositely directed tangential paths through the separator.

It is still another object of the invention to provide a spherical liquid and gas separator of the foregoing type including a mist extractor mounted in the top portion thereof and containing an integral bypass for bypassing gas around the mist extractor should the pressure drop across the latter become excessively high.

These and further objects and advantages of the invention will become more apparent on reference to the following specification and claims and appended drawings wherein:

Figure 3 is a horizontal section of the separator of

Figure 1:
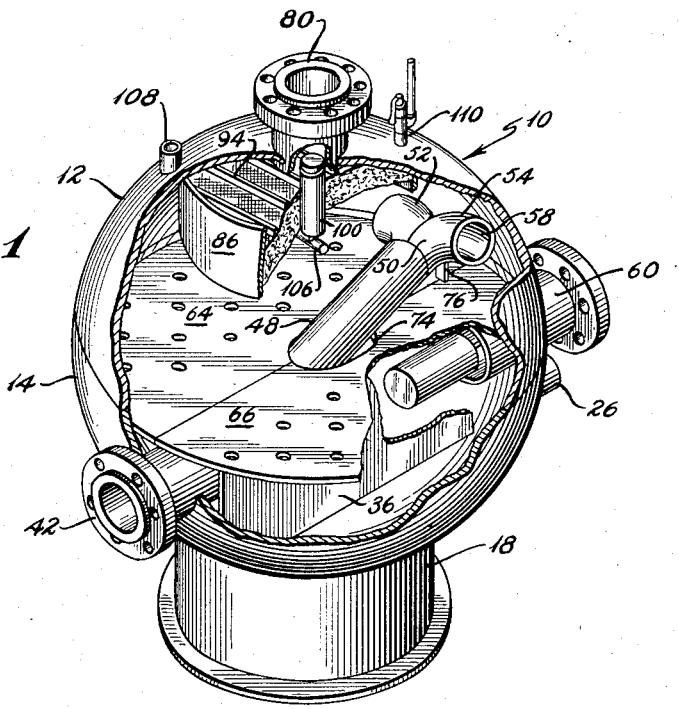
Figure 1 is a perspective view, partly in section, showing a separator constructed according to the present invention.
Figure 2:
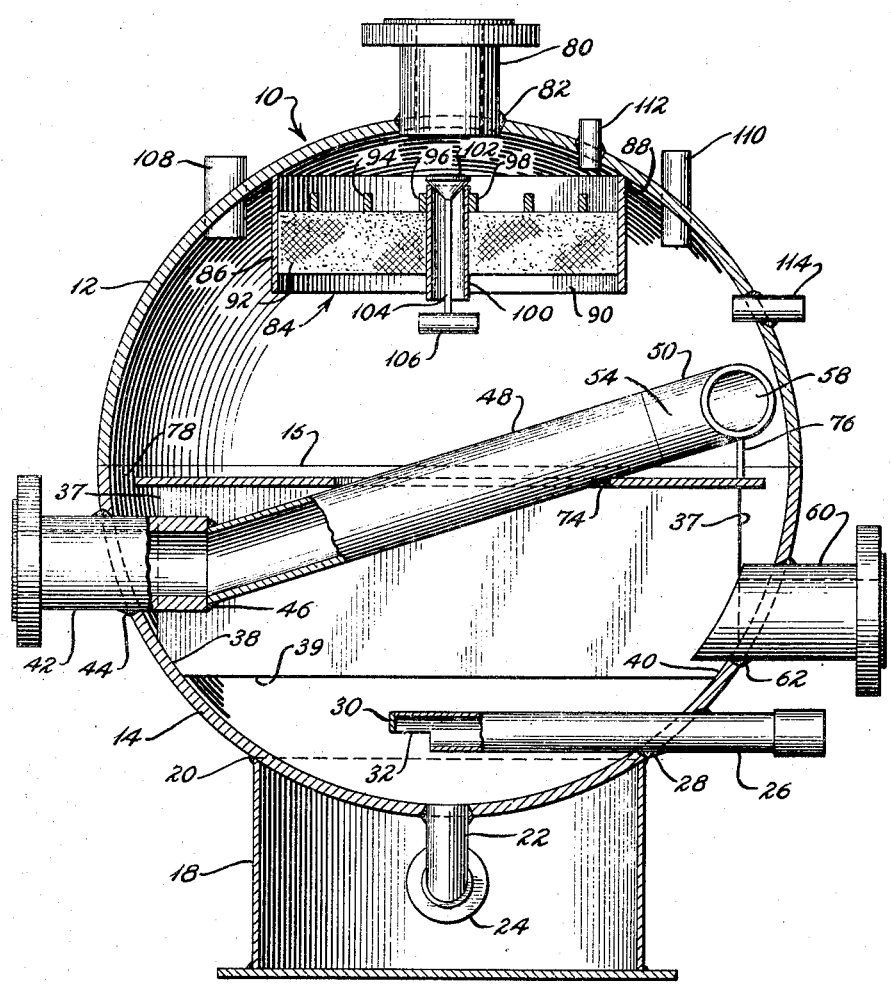
Figure 2 is a vertical section of the separator of Figure 1.

Figures 1 and 2 taken along the horizontal center plane of the tank.

Referring more particularly to the figures of the drawing there is shown at 10 a spherical liquid and gas separator comprised of a pair of hemispherical tank halves 12 and 14 joined by welding on a horizontal center plane 16. A base skirt 18 is welded to the lower tank half 14 at 20 to provide a support or mounting for the unit. A drain pipe 22 is connected to the bottom of the lower tank half 14 and passes through an opening 24 in skirt 18 to a suitable drain valve, not shown. An oil outlet pipe 26 extends horizontally into the lower tank half 14 and is welded thereto at 28. The inner end of oil outlet pipe 26 terminates roughly at the vertical center of the lower tank half and is closed at 30 and provided with a downwardly facing opening 32.

Mounted above the oil outlet pipe 26 in the lower tank half 14 are a pair of vertical baffle plates 34 and 36 having arcuately trimmed lower corners 38 and 40 which are welded to the interior of the lower tank half 14. The vertical baffle plates 34 and 36 are spaced approximately equidistantly of a vertical center plane passing through the oil outlet pipe 26. The vertical edges 37 and the horizontal edges 39 of the vertical plates 34 and 36 terminate short of the peripheral wall of the lower tank half, as is best seen in Figure 2, except at the trimmed portions 38 and 40 which are welded to the tank half and serve as the supporting connection for the plates.

An oil and gas inlet 42 enters the lower tank half 14 between the vertical baffle plates 34 and 36 and is welded to the lower tank half at 44. The axis of the inlet 42 is parallel to the vertical baffle plates 34 and 36 and is approximately midway therebetween. The inlet 42 is located below the center plane 16 of the separator unit as may be seen in Figure 2. Welded to the inlet 42 at 46 is an inlet pipe 48 which extends upwardly from the inlet 42 at an angle of approximately 20 degrees. Inlet pipe 48 terminates short of the inside wall of the upper tank half 12 and has a flow diverter 50 mounted thereon at this point.

Figure 3:
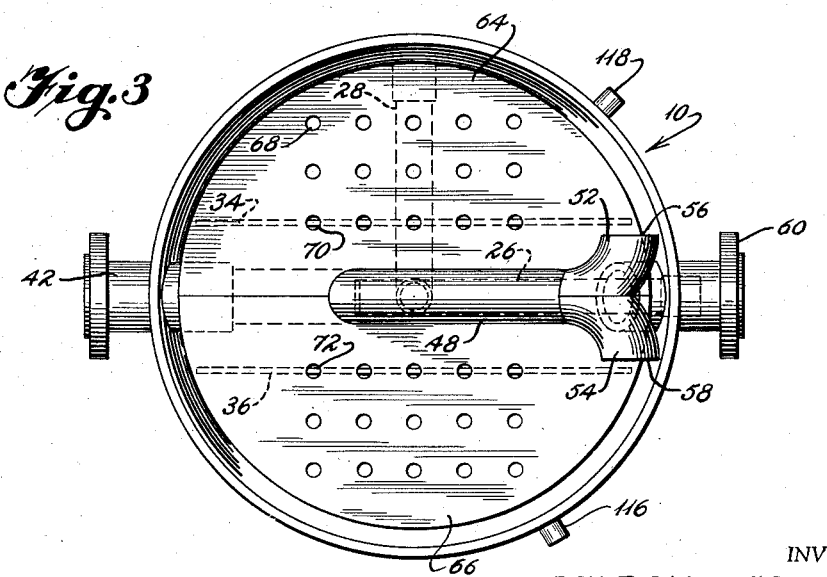

Referring particularly to Figures 1 and 3, the flow diverter 50 consists of a pair of elbows 52 and 54 cut and welded together to provide a pair of outlets 56 and 58 which form flow paths for directing incoming oil and gas tangentially against the inner surface of the wall of the upper tank half 12 in opposite directions. A suitable liquid level control pipe 60 also enters the lower tank half 14 substantially midway between vertical baffle plates 36 and 38 and is welded thereto at 62.

A horizontal baffle consisting of two half circles 64 and 66 are mounted atop the upper edges of vertical baffle plates 34 and 36. The semicircular plates 64 and 66 are provided with rows of apertures 68, and the innermost row 70 and 72 in each plate is located directly above the vertical baffle plate therebeneath. Plates 64 and 66 are secured to vertical baffle plates 34 and 36 by plug welding through these inner rows of apertures 70 and 72. The plates 64 and 66 are cut at the center thereof to form a central elongated aperture 74, best seen in Figures 1 and 2, through which the inlet pipe 48 passes. An upstanding bracket 76 is welded to the plates 64 and 66 along the center line thereof to support the flow diverter 50, as is best seen in Figures 1 and 2.

The diameter of the horizontal plates 64 and 66 is smaller than the diameter of the tank halves so that a clearance is provided between the horizontal baffle plates and the inner wall of the lower tank half at 78, as is best seen in Figure 2. The horizontal baffle is preferably mounted just below the horizontal center plane 16. It will thus be seen that both the oil inlet and the oil outlet are provided in the lower tank half 14, but the oil inlet is connected to an oil inlet pipe 48 which extends into the upper tank half 12 and terminates in a flow diverter substantially at the wall of this upper tank half.

A gas outlet 80 is welded to the top of the upper tank half 12 at 82. Immediately below the gas outlet 80 a mist extractor is provided and is indicated generally at 84. The mist extractor 84 comprises a cylindrical ring 86 welded to the upper tank half at 88 so as to seal the ring to the tank about its periphery. A series of parallel bars 90 extend across the lower end of the ring 86 and are secured thereto in any suitable manner, such as by welding. A pad of wire mesh or other suitable porous material 92 is carried by the lower bars 90 and is secured in position by a second set of bars 94 which are also welded to the inside of the cylindrical ring 86. The bars 94 extend at right angles to the bars 90.

Welded to the central pair of bars 96 and 98 in the upper group of bars 94 and between the corresponding central pair of bars in the lower group 90 is a bypass pipe 100. The pipe 100 passes through the pad of wire mesh 92 and has a conical valve member 102 removably received in the upper end thereof. A rod 104 depends from the conical valve member 102 and carries a rod-like weight 106 at the lower end thereof. When the pressure drop across the wire pad 92 becomes excessive, either due to a clogging of the pad or an excessive feed rate, the pressure beneath the conical valve member 102 causes that valve member to raise against the force of gravity exerted by the weight 106 thereby protecting the mist extractor from damage. When this excessive pressure disappears, the weight 106 again lowers the valve member 102 to cause the mist extractor to again function. The weight 106 is preferably larger than the pipe 100 in at least one dimension, so as to prevent a sudden surge of pressure from blowing the valve member 102 and rod 104 completely out of the pipe 100.

A safety head outlet 108 is provided in the upper portion of upper tank half 12, as seen in Figures 1 and 2, and a relief valve fitting 110 is also provided. A pressure gauge connection 112 may also be provided in the upper tank half, as well as a thermometer connection 114. A gauge glass connection 116 and a floatless liquid level controller connection 118 may also be provided in the lower tank half.

In the operation of the separator of the invention a mixed stream of liquid (oil, water, etc.) and gas enters the tank 10 at a relatively high velocity through the inlet 42. This stream is conducted by inlet pipe 48 across the tank and is discharged from outlets 56 and 58 in flow diverter 50. The streams of mixed liquid and gas issuing from these outlets impinge tangentially and substantially horizontally upon the walls of the upper tank half 12 and flow directly away from one another circumferentially around the inner tank surface. Since the two flows are moving in opposite directions, there is little tendency to set up a large swirl in the liquid which collects at the bottom of the tank. The use of two equal flows in this manner provides a liquid gas interface which is double that which would be obtained with a single tangential flow of fluid.

Gas entrapped in the liquid escapes therefrom as the mixture flows around the periphery of the tank and rises upwardly toward the mist extractor 84. The liquid continues on down through the space 78 between the horizontal baffle plates 64 and 66 and collects in the bottom of the tank. The oil thus collected is removed by the oil outlet pipe 26. Horizontal baffle plates 64 and 66 prevent large liquid drops from bouncing and splashing much above the horizontal center plane of the tank.

The gas stream containing fine liquid particles below the critical size moves upward and enters the mist extractor 84 uniformly over its entire lower surface. The gas stream then follows a tortuous upward course through the wire mesh. The fine particles of liquid entrained in the gas stream contact the wetted surface of the wire mesh and coalesce with the liquid film which is already held on the mesh by surface tension. As the liquid film becomes thicker, drops of liquid of a size too large to be held in suspension by the slowly upwardly moving gas form and fall away from the mesh and continue to fall downward through the slowly moving gas stream until they reach and comingle with the liquid body in the bottom of the lower tank half 14. A stream of dry gas leaves the top surface of the mist extractor 84 and rapidly speeds up due to the diminishing cross section of the tank 10 above the mist extractor. The gas leaves the tank at a high velocity through the gas outlet 80 at the top of the tank 10.

The bypass integrally mounted through the center of the mist extractor is employed to prevent a dangerous build up of pressure differential across the mist extractor. The material of the mist extractor taken in conjunction with its dimensions is such that a relatively low pressure drop is provided thereacross. In the event that the mist extractor becomes overloaded or the pressure drop increases for some other reason, such as due to plugging by paraffin or other foreign material, the bypass serves to carry part or all of the gas stream around the mist extractor element. In the event of such a dangerous build up, the pressure differential between the area above the mist extractor and the remainder of the tank becomes sufficiently great to lift the conical valve element 102 on top of the bypass pipe 100, thereby opening a passage between these two areas, equalizing the pressures above and below the extractor and preventing serious damage thereto. Such an occurrence does not seriously affect the quantity of liquid carried off by the gas, since the greatest portion of the liquid is removed from the gas prior to passage through the mist extractor as a result of the action in the remainder of the unit. After the dangerous pressure unbalance has disappeared, which incidently may necessitate steaming out or some other method of cleaning in the case of paraffin plugging, the weight 106 causes the conical valve member 102 to again seat against the top of bypass pipe 100, thereby sealing this passage and making the safety bypass again fully effective. The mist extractor is simple and rugged and requires no springs, diaphragms or liquid seals. The center mounting of the bypass valve allows the wire mesh to be coiled about the bypass conduit to secure a tight fit. Because of the unique construction of the bypass valve, it cannot hang open when dislodged by a sudden surge.

It will be apparent from the foregoing that the spherical separator of this invention may be manufactured in two separate halves so that the halves may be merely welded together as a final step in the manufacturing process. The gas and oil inlet pipe and the oil outlet pipe are both provided in the lower half of the unit, while the liquid and gas mixture is delivered into the unit in the upper half thereof in two opposed tangential streams which flow around the periphery of the tank.

One serious disadvantage with tangential inlets is the phenomenon whereby fluids dissipate their kinetic energy by whirling the contents of the vessel. This makes liquid level control erratic and greatly increases the chances of re-entrainment of liquid particles in the gas. Another drawback of tangential installations is the method of installation, which is more costly than conventional straight-in inlets.

The inlet arrangement of the present invention eliminates these disadvantages and provides relatively tranquil conditions in the tank even under high flow conditions. The mist extractor having an integral automatically operated bypass permits the use of these high flow rates without damage to the mist extractor when the flow rate inadvertently exceeds the design rate.

The invention may be embodied in other specific forms without departing from the spirit or essential characteristics thereof.

The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A liquid and gas separator comprising a spherical tank, a liquid and gas inlet in the wall of said tank in close proximity to a horizontal plane passing through the center of the tank, an inlet conduit connected to said inlet and extending across said tank, a flow diverter associated with said conduit and defining a pair of arcuate discharge paths for discharging liquid and gas tangentially onto the internal surface of said tank in opposite directions, said discharge paths being smoothly curved about centers of curvature, one said center on each side of a vertical plane through the axis of said inlet conduit, said centers of curvature being on the same side of said internal surface against which said liquid and gas is discharged as said inlet conduit, so that in passing through said discharge paths and in flowing onto said internal surface said liquid and gas is subjected to a centrifugal force in the same general direction, a liquid outlet in the lower portion of said tank, and a gas outlet in the upper portion of said tank.

2. A liquid and gas separator as set out in claim 1 wherein said flow diverter comprises arcuate conduits connected to said inlet conduit and curving away from the center line thereof in smooth curves and terminating substantially at the internal surface of said tank.

3. A liquid and gas separator as set out in claim 2 wherein said diverter comprises a pair of elbows having portions of corresponding ends thereof cut away on planes generally parallel to the axes of said elbows, said elbows being welded together at said cutaway ends and attached to said inlet conduit.

4. A liquid and gas separator comprising a spherical tank, a liquid and gas inlet in the wall of said tank in the lower half thereof, an inlet conduit connected to said inlet and extending across said tank and upwardly into the upper half of said tank, a flow diverter associated with said conduit and defining a pair of arcuate discharge paths for discharging liquid and gas tangentially onto the internal surface of said tank in opposite directions, said discharge paths being curved into a direction to cause centrifugal force to urge liquid flowing therethrough onto said internal tank surface, a liquid outlet in the lower portion of said tank, and a gas outlet in the upper portion of said tank.

5. A liquid and gas separator comprising a spherical tank, a liquid and gas inlet in the wall of said tank below and adjacent a horizontal plane passing through the center of said tank, an inlet conduit connected to said inlet and extending across said tank and upwardly through said horizontal plane, a flow diverter associated with said conduit and defining a pair of arcuate discharge paths for discharging liquid and gas tangentially onto the internal surface of said tank in opposite directions above and adjacent to said horizontal plane, said discharge paths being curved in a direction to cause centrifugal force to force liquid flowing therethrough onto said internal tank surface, a liquid outlet in the lower portion of said tank, and a gas outlet in the upper portion of said tank.

6. A separator as set out in claim 5 including vertical baffles in the lower portion of said tank and a horizontal baffle mounted on said vertical baffle.

7. A separator as set out in claim 6 wherein said inlet conduit passes through said horizontal baffle at substantially the center of said tank.

8. A separator as set out in claim 7 wherein said vertical baffles comprise plates on either side of said inlet, and wherein said horizontal baffle comprises apertured plates attached to said vertical plates.

9. A separator as set out in claim 8 wherein said horizontal baffle is round and has a diameter smaller than the diameter of said tank in the plane in which said baffle is mounted.

10. A separator as set out in claim 9 wherein said horizontal baffle plates each contain a series of apertures overlying the vertical plates supporting them and are plug welded to said vertical plates through said apertures.

11. A separator as set out in claim 9 wherein said liquid outlet comprises a horizontal pipe below said vertical plates and parallel thereto, said pipe terminating in a downwardly directed opening substantially in the vertical center of said tank.

References Cited in the file of this patent
UNITED STATES PATENTS

| | | |
|---|---|---|
| 1,786,790 | Sutton | Dec. 30, 1930 |
| 1,864,201 | Kegerreis et al. | June 21, 1932 |
| 2,427,525 | Glanzer | Sept. 16, 1947 |
| 2,642,949 | Tyskewicz | June 23, 1953 |
| 2,678,699 | Fowler | May 18, 1954 |
| 2,756,837 | Lovelady et al. | July 31, 1956 |
| 2,777,533 | Segrest | Jan. 15, 1957 |